United States Patent Office 2,721,858
Patented Oct. 25, 1955

2,721,858

METHOD OF MAKING α-CYANOACRYLATES

Frederick B. Joyner and Gary F. Hawkins, Kingsport, Tenn., assignors to Eastman Kodak Company, Rochester, N. Y., a corporation of New Jersey No Drawing. Application March 10, 1954,
Serial No. 415,422

14 Claims. (Cl. 260—67)

This invention relates to the preparation of α-cyanoacrylates and is particularly concerned with the preparation of monomeric α-cyanoacrylates useful as adhesive compositions.

The monomeric form of an α-cyanoacrylate is usually prepared by the depolymerization of a polymer thereof which is formed by reacting a cyanoacetate with formaldehyde or a polymer of formaldehyde in the presence of a basic condensation catalyst. Heretofore the reaction between the cyanoacetate and the formaldehyde was effected in aqueous medium, usually by employing an aqueous solution of formaldehyde. A method of this kind was disclosed in Ardis U. S. Patent 2,467,927.

The monomeric α-cyanoacrylates are readily polymerizable without the use of either heat or a catalyst, and it has consequently been difficult to store the monomer without premature polymerization. This is particularly true with the monomeric α-cyanoacrylates prepared from polymer made in aqueous medium, since the presence of even small amounts of water catalyzes the polymerization reaction and hence contributes to the instability of the monomer. It has been difficult to reduce the moisture content of the polymeric α-cyanoacrylates to a sufficiently low level prior to depolymerization to give monomers having good stability at room temperature in bulk. Furthermore, the presence of even small amounts of moisture made the depolymerization reaction difficult to perform because of the elevated temperatures which were necessary to effect the depolymerization.

It is accordingly an object of this invention to provide a new and improved method of preparing α-cyanoacrylates.

It is another object of this invention to prepare monomeric α-cyanoacrylates having improved stability against autopolymerization by a process which is more readily effected than were the processes known heretofore.

Another object of the invention is to provide a simple and straightforward process whereby the depolymerization of polymeric α-cyanoacrylates is greatly facilitated.

Another object of the invention is to facilitate the production of monomeric α-cyanoacrylates by ensuring the formation of substantially anhydrous polymeric α-cyanoacrylates without the necessity of subjecting the polymer to prolonged drying periods with the attendant economic disadvantages.

Another object of the invention is to provide monomeric α-cyanoacrylates having a moisture content below that which can be readily obtained by drying the polymeric α-cyanoacrylates in an oven or similar drying apparatus prior to depolymerization.

Another object of the invention is to provide monomeric α-cyanoacrylates having increased utility as adhesive compositions and being substantially free of traces of water which would otherwise catalyze premature polymerization.

Another object of the invention is to improve the commercial production of monomeric α-cyanoacrylates which are useful as adhesive compositions and also as molding polymers.

Other objects will be apparent from the description and claims which follow.

These and other objects are attained by means of this invention, which in its broader aspects comprises reacting a cyanoacetate with formaldehyde in the presence of a basic condensation catalyst and in solution in a non-aqueous organic solvent which distills below the depolymerization temperature of the polymer formed by the reaction, and thereafter removing the solvent and the water formed during the reaction simultaneously, whereby a substantially anhydrous polymeric α-cyanoacrylate is obtained. This polymeric α-cyanoacrylate containing at most a very small percentage of moisture can then be readily depolymerized at a relatively low temperature by heating the polymer in the presence of a polymerization inhibitor and condensing the monomeric vapors evolved therefrom.

A number of methods have been proposed for preparing monomeric α-cyanoacrylates. The most effective method, however, involves reacting a cyanoacetate with formaldehyde in the presence of a basic condensation catalyst to give a low molecular weight polymer of an α-cyanoacrylate. Prior to this invention the reaction was carried out using aqueous formaldehyde solution, and usually the commercial solution known as Formalin, which contains from 33 to 40 percent by weight of formaldehyde. In these prior art processes, a 2-phase reaction mixture was obtained, and the water phase was drawn off from the polymer phase. The crude polymer thus obtained still contained a substantial amount of moisture, and in many cases it was then necessary to try to dehydrate the polymer before depolymerization. This was difficult, however, because the polymer of α-cyanoacrylic ester tenaciously held traces of water and required long periods of drying. Thus, for example, polymethylcyanoacrylate prepared in aqueous medium must be dried in a circulating air oven at 50° C. for 36 to 48 hours to reduce the water content to 0.4%. We have now found that the presence in the polymer of such small amounts of water as 0.4% contributes to the instability of the depolymerized monomer, even though large amounts of a polymerization inhibitor, such as 4 to 5 percent of phosphorous pentoxide, is used in the depolymerization operation. Furthermore, when the polymer is subjected to prolonged periods of drying, the polymer becomes hard, and the subsequent depolymerization is difficult.

We have now found that when the reaction between the cyanoacetate and the formaldehyde is carried out in solution in a non-aqueous organic solvent, the water formed during the reaction can be separated out with the solvent, leaving a polymer which has a very low moisture content. No drying period is required after removal of the solvent-water mixture, and the polymer can consequently be depolymerized directly after the removal of the solvent. Furthermore, the polymers thus prepared have a low softening point and can be readily caused to flow at temperatures of 75 to 95° C., whereby the preparation of the monomeric α-cyanoacrylate can be carried out in a continuous process if desired. The polymeric α-cyanoacrylates are more readily depolymerized and better yields are obtained since less severe heating is required in the depolymerization stage. Because of the low water content, the monomer prepared in accordance with this invention has a higher degree of stability against polymerization than those monomers prepared using an aqueous reaction medium. This is true even though a polymerization inhibitor is used to further stabilize the monomer.

The process embodying this invention is applicable for preparing any of the esters of α-cyanoacrylic acid. Thus any cyanoacetate can be used in practicing the invention. The α-cyanoacrylates which are of greatest utility, particularly from the standpoint of use as adhesive compositions, are those which are alkyl, cyclohexyl, or phenyl esters of α-cyanoacrylic acid. Consequently, the process is preferably employed using an alkyl cyanoacetate, a cyclohexyl cyanoacetate, or a phenyl cyanoacetate. The alkyl esters are desirably those in which the alkyl group contains from 1 to about 16 carbon atoms, with the lower alkyl esters containing from 1 to 4 carbon atoms being preferred. Thus, for example, the cyanoacetate is preferably methyl cyanoacetate, ethyl cyanoacetate, propyl cyanoacetate, butyl cyanoacetate, cyclohexyl cyanoacetate, or phenyl cyanoacetate, although the higher alkyl cyanoacetates such as palmityl cyanoacetate can be used if desired. The cyanoacetate is reacted with formaldehyde, and in this application the term "formaldehyde" is intended to include formaldehyde itself, as well as the polymer thereof such as p-formaldehyde or the like, but is not intended to include aqueous solutions of formaldehyde as typified by Formalin.

The reaction between the cyanoacetate and the formaldehyde to form a polymeric α-cyanoacrylate is readily effected by heating the reaction mixture to a temperature of about 50 to 90° C. in the presence of a basic condensation catalyst. A large number of basic condensation catalysts are known, and any of such materials can be used to catalyze the reaction. Thus the catalyst can be any basic material, including the inorganic bases such as sodium or potassium hydroxide, ammonia, or ammonium hydroxide, the organic bases such as quinoline, piperidine, isoquinoline, dialkyl amines such as diethyl amine, alkali metal alkoxides such as sodium or potassium methoxide or ethoxide, or similar well known basic material. The amount of catalyst is not critical and can be varied if desired. Ordinarily, a very small amount of the basic material such as about 0.001 to 0.5 percent by weight is completely adequate. Larger amounts can be used but are not necessary and may be disadvantageous in some cases if they are carried over into the polymeric product and hence into the monomeric product, since basic materials catalyze the polymerization of the α-cyanoacrylate monomer.

In the process embodying this invention, the reaction is carried out in solution in a non-aqueous organic solvent which has a distilling temperature below the depolymerization temperature of the polymer formed by the reaction. The solvent used can be any of the non-ionizable organic solvents which do not affect the course of the reaction. After the chemical reaction described above has been completed, a quantity of the solvent may be removed by distillation. In carrying out the process, it is then desirable to introduce into the reaction mixture an organic solvent which is capable of forming an azeotrope with the water, whereby the removal of the water with the remaining solvent is facilitated. The azeotropic solvent can be introduced initially and form the solvent medium for the reaction itself, or it can be introduced initially in admixture with another organic solvent, or it can be introduced into the reaction mixture after the reaction has been effected and prior to the separation of the reaction solvent. In most cases, the solvent which is employed will be one which is at least partially miscible with water, although solvents which are immiscible with water can be used in some cases with slightly less advantageous results. Among the reaction solvents which are preferably employed are the monohydric alcohols, and particularly the lower alkyl monohydric alcohols such as methanol, isopropanol, butanol or the like; aliphatic ethers, and particularly the lower dialkyl ethers such as diethyl ether, di-isopropyl ether and the like; benzene, chloroform, cyclohexane, or similar well known organic solvents which distill at a temperature below the temperature of that employed for depolymerizing the α-cyanoacylate polymer. To remove the water formed during the reaction, benzene and similar solvents which readily form azeotropes with water are desirably employed. They may be the sole solvent for the reaction, or, alternately, they may be added at any time after the completion of the reaction to facilitate removal of the water formed.

Following the reaction between the cyanoacetate and the formaldehyde, the solvent and water are separated from the polymeric product. This separation is readily effected by distilling out the mixture of organic solvent and water from the reaction mixture. Using an azeotrope-forming solvent such as benzene, the reaction solvent, water, and the benzene can usually be distilled off as a ternary azeotrope, and the water content of the polymer is reduced to a value of less than 0.4%. In some cases, it may be desirable to distill off part of the reaction solvent from the reaction mixture when such solvent is not an azeotrope-forming solvent. This is done in the preferred method before adding to the reaction mixture an azeotrope-forming solvent, such as benzene, since the water formed during the reaction stage remains in the reaction mixture even when the solvent content has been reduced by as much as 80 to 90 percent. It is necessary, of course, that the azeotrope distill at a temperature below the depolymerization temperature of the polymeric product. In most cases, however, this is not a problem using the volatile organic solvents, since depolymerization is usually effected by heating the polymeric product at a temperature of the order of 100–150° C. under a vacuum of the order of 1 mm. Hg.

The substantially anhydrous crude polymer thus obtained as a residue can then be directly depolymerized without the necessity of a further drying operation. Depolymerization is usually effected by heating the polymer under reduced pressure and in the presence of a polymerization inhibitor. In some cases, it may be desirable to include a plasticizer such as tricresyl phosphate to give a low melting and readily depolymerized polymer, although this is not necessary for successful operation. Because of the inherent instability of the monomeric α-cyanocrylates, it is desirable to effect the depolymerization in the presence of a polymerization inhibitor, even though the low water content of the polymer gives increased stability to the monomer. Any of the acidic inhibiting substances can be used, including phosphorous pentoxide, antimony pentoxide, picric acid, hydroquinone, tertiary butyl catechol, metaphosphoric acid, maleic anhydride, ferric chloride, or the like. A particularly desirable group of polymerization inhibitors are the acidic gaseous inhibitors such as sulfur dioxide, nitric oxide, hydrogen fluoride, and the like. Usually it is desirable to include a polymerization inhibitor in the reaction vessel containing the polymer being depolymerized, and also to collect the monomeric vapors in a receiving vessel also containing a polymerization inhibitor. Best results are obtained by also introducing into the system a stream of gaseous inhibitor which mixes with the monomeric vapors evolved during the depolymerization and dissolves in such vapors to some extent when the vapors are condensed. Phosphorous pentoxide is desirably employed in the depolymerization vessel, and sulfur dioxide is desirably introduced into the system as the gaseous inhibitor. A particularly stable composition is obtained when the receiving flask contains a small amount of hydroquinone, whereby a monomer composition is obtained which contains a mixture of sulfur dioxide and hydroquinone.

Since the polymers prepared in accordance with this invention melt readily at a temperature of 75 to 95° C., the process can be readily carried out in continuous fashion since the solvent can be removed from the crude reaction mixture, the polymers melted and caused to flow into a depolymerization vessel. If desired, however, the process can be carried out batchwise with good results.

The improved stability which is obtained by means of a mixture of sulfur dioxide and hydroquinone are disclosed in the copending application of Coover and Dickey, Serial No. 409,756, filed February 17, 1954.

The monomeric α-cyanoacrylic esters prepared in accordance with this invention are excellent adhesive compositions for bonding almost any type of material to itself or to a dissimilar material. The use of such compositions as adhesives is disclosed in the copending application of Coover, Serial No. 318,325, filed November 1, 1952. The adhesive compositions are readily employed by merely spreading them in a thin film on the surface to be bonded. Polymerization occurs within a few seconds without the use of either heat or a polymerization catalyst, and the bonds which are obtained are of very high strength.

The invention is illustrated by the following examples, which are not intended to limit the scope of the invention unless otherwise specifically indicated.

*Example 1*

A mixture of 743 g. of methyl cyanoacetate, 225 g. of p-formaldehyde, 2 ml. of piperidine and 743 g. of methanol is heated to reflux under agitation. After 2 hours at reflux, a yellow, slightly viscous solution is formed. One hundred and ten grams of tricresyl phosphate are added and 80 to 90% of the methanol is removed by distillation. Eight hundred ml. of benzene is added. The ternary azeotrope of benzene, methanol and water is removed under distillation. About 250 ml. of combined methanol and water is removed in this manner. Then 33 g. of phosphoric anhydride and 25 g. of hydroquinone are added. The benzene which remains in the mixture is removed by distillation. The polymer thus formed is depolymerized by heating under reduced pressure and in the presence of sulfur dioxide. The depolymerized monomer passes upward through a short column and is collected in a Dry Ice cooled receiver. This material after agitation under 1 mm. pressure to reduce the sulfur dioxide content to 0.002% is adhesive grade without further processing. The yield of monomer by this process is 80%. The monomer containing 0.002% sulfur dioxide is stable at room temperature for several months and at 40° for more than 48 hours.

*Example 2*

The use of a plasticizer such as tricresyl phosphate as illustrated in the preceding example is not necessary for optimum results in the process embodying this invention. Thus the process described in Example 1 can be repeated without the use of the plasticizer. As in the preceding example, a good yield of monomeric methyl α-cyanoacrylate is obtained.

*Example 3*

A mixture of 743 g. of methyl cyanoacetate, 225 g. of p-formaldehyde, 2 g. of sodium methoxide, and 743 g. of isopropanol is heated to reflux under agitation. The reaction mixture is refluxed for 2 hours and then between 80 and 90% of the alcohol is distilled off. The reaction mixture is diluted by the addition of 800 ml. of benzene, and the resulting azeotrope is removed by distillation. The resulting substantially anhydrous polymeric product is then mixed with 33 g. of phosphorous pentoxide and 25 g. of hydroquinone. Residual benzene is removed by further distillation, and the polymer is then depolymerized by heating at 150° C. and 1 mm. Hg pressure. Sulfur dioxide is passed into the system during the depolymerization, and the monomer evolved is condensed and collected in a cooled receiver. The yield of monomer by such process is in excess of 75%, and when the sulfur dioxide content is reduced to 0.002%, an excellent adhesive composition is obtained.

*Example 4*

Similar results are obtained in accordance with the process of the preceding example using isobutanol as the solvent instead of isopropanol.

*Example 5*

A mixture of 743 g. of methyl cyanoacetate, 225 g. of p-formaldehyde, 2 ml. of piperidine and 743 g. of benzene is refluxed and stirred for 2 hours. The benzene-water azeotrope is then removed by distillation, and the polymer is depolymerized as described in the preceding examples. The results obtained are comparable to those obtained with the alcoholic solvents.

*Example 6*

The process described in Example 2 can be carried out using diisopropyl ether as the solvent instead of methanol. The results obtained are comparable to those obtained in the preceding examples.

*Example 7*

The advantages of the process embodying this invention are most clearly illustrated by the following example, wherein the polymer is prepared in aqueous solution in accordance with prior practices. Thus methyl cyanoacetate containing 0.3% piperidine is added slowly to a stirred solution of 36% aqueous formaldehyde maintained at a temperature of 80 to 90° C. The addition is carried out over a 2-hour period, and the temperature is maintained for an additional hour. The hot reaction mixture is then poured into large evaporating dishes, and the aqueous layer is decanted. The polymer obtained as a residue becomes hard and brittle after cooling. This material is pulverized into a fine powder and dried at 50° C. in a circulating air oven for 24 hours. The moisture content of the resulting polymer is 0.5%. The dry powdered polymer is then depolymerized by heating with 4% phosphoric anhydride and 3.5% hydroquinone at a temperature of 160-190° C. under a pressure of 9-16 mm. in the presence of sulfur dioxide. The resulting monomeric methyl α-cyanoacrylate is stirred under reduced pressure until the sulfur dioxide content reaches 0.002%. This material becomes cloudy after standing at room temperature for several days and polymerizes to a gel within 1 hour at 40° C. After standing for less than 1 week at room temperature, the monomeric material will become polymerized and completely unsuitable for use as an adhesive.

*Example 8*

A mixture of 1 molecular equivalent of isobutyl cyanoacetate and 1 molecular equivalent of p-formaldehyde is reacted in methanol in the presence of piperidine. Following the reaction, benzene is added to the reaction mixture, and the resulting azeotrope is removed by distillation. After depolymerization a good yield of isobutyl cyanoacrylate is obtained.

*Example 9*

Similar results can be obtained with any of the cyanoacetates as described herein. Thus, for example, the procedure of Example 2 is followed using ethyl cyanoacetate in place of methyl cyanoacetate. The yield of monomeric cyanoacrylate is comparable to that obtained in the preceding examples.

*Example 10*

Phenyl cyanoacetate can be used in place of methyl cyanoacetate in the procedure of Example 2 to give a good yield of phenyl α-cyanocrylate.

*Example 11*

Cyclohexyl cyanoacetate is used in place of a methyl cyanoacetate in the process as described in Example 2 to give a good yield of cyclohexyl α-cyanoacrylate.

Example 12

A mixture of 148.5 grams (1.5 M) of methyl cyanoacetate, 45.0 grams (1.5 M) of solid para-formaldehyde, 0.5 ml. piperidine as catalyst and 148.5 grams of methanol is heated to reflux temperature (68–70° C.) with vigorous agitation. Refluxing is continued until the reaction is complete. Upon completion of the reaction, the methanol is distilled off with the temperature increasing to 79–80° C. and 250 ml. of benzene is then added. As the water of reaction is azeotroped off the temperature gradually increases to 79–80° C. Upon addition of 6.7 grams of phosphoric anhydride and 5.0 grams of hydroquinone, the temperature increases to 84–85° C. The remainder of the benzene is removed and the product vacuum distilled in the presence of sulfur dioxide gas. The following conditions are usually employed during the pyrolysis and vacuum distillation. The pot temperature ranges from 160–230° C., the vapor temperature from 60–90° C., and the pressure from 6–14 mm. Hg. Yield of the monomeric form of methyl alpha-cyanoacrylate is usually between 76–85% of the theory based on the methyl cyanoacetate.

Example 13

A mixture of 326.8 grams of benzene, 163.4 grams (1.65 M) methyl cyanoacetate, 50.0 grams (1.65 M) of solid para-formaldehyde, and 1.0 ml. piperidine is allowed to reflux until the reaction is complete. The water of reaction is removed as formed. Then 6.0 grams P$_2$O$_5$ and 3.0 grams of hydroquinone are added and the benzene medium recovered. The pyrolysis and vacuum distillation, in the presence of SO$_2$, are effected at a pot temperature of 134–190° C., vapor temperature of 56–88° C., and pressure of 9–14 mm. Hg. The yield of the monomer is 70% of theory based on methyl cyanoacetate.

Example 14

An azeotropic reaction medium is used composed of 112 grams of CH$_3$OH and 188 grams of C$_6$H$_6$, to which 148.5 grams (1.5 M) of methyl cyanoacetate, 45.0 grams (1.5 M) of solid para-formaldehyde, and 0.5 ml. piperidine, as catalyst, are added. The reaction is completed between 58° and 62° C. Upon completion of reaction, the major portion of the azeotropic mixture is removed and replaced with benzene for the purpose of azeotroping off the water. When dry, 6.7 grams of P$_2$O$_5$ and 5 grams of hydroquinone are added and the benzene is recovered. The product is pyrolyzed and vacuum distilled in the presence of SO$_2$ and at a pot temperature of 171–190° C., a vapor temperature of 73–78° C., and a pressure of 14–17 mm. Hg. The yield of the monomeric methyl alpha-cyanoacrylate is 72.5% of theory based on the methyl cyanoacetate.

Thus by means of this invention monomeric α-cyanoacrylates are readily prepared by a simple and straightforward process. The necessity for prolonged periods of drying is completely obviated, and the disadvantages inherent in subjecting the polymeric material to elevated temperatures for prolonged periods are overcome. The nature of the polymeric product obtained using a non-aqueous solvent as described herein makes possible the use of a continuous process whereby excellent yields of monomer are obtained in a more economical fashion than was possible heretofore. The monomeric material containing a very low percentage content of water has increased stability against polymerization and hence, when stabilized with stabilizers such as sulfur dioxide and hydroquinone, compositions of excellent shelf stability are obtained.

The invention has been described in considerable detail with particular reference to certain preferred embodiments thereof, but it will be understood that variations and modifications can be effected within the spirit and scope of the invention as described hereinabove, and as defined in the appended claims.

We claim:

1. The method which comprises reacting a cyanoacetate of the formula

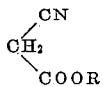

wherein R is a member of the group consisting of alkyl, cyclohexyl and phenyl groups, with formaldehyde to form a polymeric α-cyanoacrylate by heating to about 50 to 90° C. a solution of said cyanoacetate, said formaldehyde and a basic condensation catalyst in a non-aqueous organic solvent which distills at a temperature below the depolymerization temperature of said polymeric α-cyanoacrylate, and azeotropically separating water formed in said reacting from said polymeric α-cyanoacrylate without depolymerizing said polymeric α-cyanoacrylate.

2. The method which comprises reacting formaldehyde with a cyanoacetate of the formula

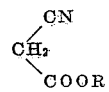

wherein R is a member of the group consisting of alkyl, cyclohexyl and phenyl groups, to form a polymeric α-cyanoacrylate, said reacting being effected by heating to a temperature of about 50 to 90° C. a solution of said cyanoacetate, said formaldehyde and a basic condensation catalyst in a non-aqueous organic solvent which distills below the depolymerization temperature of said polymeric α-cyanoacrylate, azeotropically separating water formed during the reaction from said polymeric α-cyanoacrylate, and thereafter depolymerizing the resulting substantially anhydrous α-cyanoacrylate.

3. The method which comprises reacting formaldehyde with a cyanoacetate of the formula

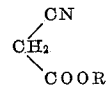

wherein R is a member of the group consisting of alkyl, cyclohexyl and phenyl groups, and thereby forming a polymeric α-cyanoacrylate, said reacting being effected by heating at a temperature of about 50 to 90° C. a solution of said formaldehyde, said cyanoacetate and a basic condensation catalyst in a non-aqueous organic solvent which distills below the depolymerization temperature of said polymeric α-cyanoacrylate, separating water formed during the reacting from said polymeric α-cyanoacrylate by introducing into the reaction mixture prior to said separating a non-aqueous water azetrope-forming organic solvent and azeotropically distilling said water from the reaction mixture, and thereafter depolymerizing the resulting substantially anhydrous α-cyanoacrylate.

4. The method which comprises reacting formaldehyde with a cyanoacetate of the formula

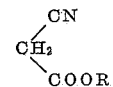

wherein R is a member of the group consisting of alkyl, cyclohexyl and phenyl groups, and thereby forming a polymeric α-cyanoacrylate, said reacting being effected by heating at a temperature of about 50 to 90° C. a solution of said cyanoacetate, said formaldehyde and a basic condensation catalyst in an aliphatic monohydric alcohol which distills below the depolymerization temperature of said polymeric α-cyanoacrylate, adding to the reaction mixture an organic solvent effective to form an azeotrope with water formed during said reacting, and azeotropically distilling said water, alcohol and organic solvent from the reaction mixture to give a substantially anhydrous polymeric α-cyanoacrylate product.

5. The method which comprises heating to about 50 to 90° C. a solution, in a lower alkyl monohydric alcohol, of an alkyl cyanoacetate, formaldehyde and a basic condensation catalyst and thereby forming a polymeric alkyl α-cyanoacrylate, adding benzene to the reaction mixture, and azeotropically separating from the reaction mixture a ternary azeotrope of said alcohol, said benzene and water formed during the reaction and thereby obtaining a substantially anhydrous polymeric alkyl α-cyanoacrylate.

6. The method which comprises heating to a temperature of about 50 to 90° C. a solution in benzene of formaldehyde, a basic condensation catalyst and a cyanoacetate of the formula

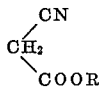

wherein R is a member of the group consisting of alkyl, cyclohexyl and phenyl groups, and thereby forming a polymeric α-cyanoacrylate, and azeotropically separating from the reaction mixture said benzene and water formed during the reaction and thereby obtaining a substantially anhydrous polymeric α-cyanoacrylate capable of being readily depolymerized.

7. The method which comprises heating to a temperature of about 50 to 90° C. a solution, in a dialkyl ether, of formaldehyde, a basic condensation catalyst and a cyanoacetate of the formula

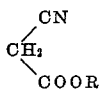

wherein R is a member of the group consisting of alkyl, cyclohexyl and phenyl groups and thereby forming a polymeric α-cyanoacrylate, adding to the reaction mixture an organic solvent capable of forming an azeotrope with water formed during the reaction, and azeotropically distilling said organic solvent, water and ether from the reaction mixture to give a substantially anhydrous polymeric α-cyanoacrylate capable of being readily depolymerized.

8. The method which comprises heating to a temperature of about 50 to 90° C. a solution in benzene of p-formaldehyde, a basic condensation catalyst and a cyanoacetate of the formula

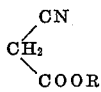

wherein R is a member of the group consisting of alkyl, cyclohexyl and phenyl groups, and thereby forming a polymeric α-cyanoacrylate, azeotropically distilling from the reaction mixture said benzene and water formed during the reaction to give a substantially anhydrous polymeric α-cyanoacrylate, and depolymerizing said substantially anhydrous polymeric α-cyanoacrylate by heating it to depolymerization temperature in the presence of a polymerization inhibitor.

9. The method which comprises heating to a temperature of about 50 to 90° C. a solution in a lower alkyl monohydric alcohol of p-formaldehyde, a basic condensation catalyst and a cyanoacetate of the formula

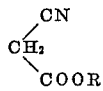

wherein R is a member of the group consisting of alkyl, cyclohexyl and phenyl groups, and thereby forming a polymeric α-cyanoacrylate, adding to the reaction mixture an organic solvent capable of forming an azeotrope with water formed during the reaction, azeotropically distilling from the reaction mixture said water, organic solvent and alcohol to give a substantially anhydrous polymeric α-cyanoacrylate, and heating said substantially anhydrous polymeric α-cyanoacrylate to depolymerization temperature in the presence of a polymerization inhibitor and thereby obtaining monomeric α-cyanoacrylate.

10. The method which comprises heating to a temperature of about 50 to 90° C. a solution, in a lower dialkyl ether, of p-formaldehyde, a basic condensation catalyst and a cyanoacetate of the formula

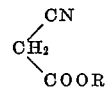

wherein R is a member of the group consisting of alkyl, cyclohexyl and phenyl groups, and thereby forming a polymeric α-cyanoacrylate, adding to the reaction mixture an organic solvent capable of forming an azeotrope with water formed during the reaction, azeotropically distilling from the reaction mixture said ether, water and organic solvent to give a substantially anhydrous polymeric α-cyanoacrylate, and heating said substantially anhydrous polymeric α-cyanoacrylate to depolymerization temperature in the presence of a polymerization inhibitor and thereby obtaining monomeric α-cyanoacrylate.

11. The method which comprises heating to a temperature of about 50 to 90° C. a solution in benzene of p-formaldehyde, a lower alkyl cyanoacetate and a basic condensation catalyst and thereby forming a polymer of a lower alkyl α-cyanoacrylate, azeotropically distilling from the reaction mixture said benzene and water formed during the reaction, and heating the resulting substantially anhydrous polymer to depolymerization temperature in the presence of phosphorous pentoxide and thereby forming monomeric lower alkyl α-cyanoacrylate.

12. The method which comprises heating to a temperature of about 50 to 90° C. a solution in a lower alkyl monohydric alcohol of a lower alkyl cyanoacetate, p-formaldehyde and a basic condensation catalyst, adding benzene to the reaction mixture, azeotropically distilling from the reaction mixture said benzene, said alcohol and water formed during the reacting, and heating the resulting substantially anhydrous polymeric lower alkyl α-cyanoacrylate to depolymerization temperature in the presence of phosphorous pentoxide and thereby obtaining monomeric lower alkyl α-cyanoacrylate.

13. The method which comprises heating to a temperature of about 50 to 90° C. a solution in a lower dialkyl ether of a lower alkyl cyanoacetate, p-formaldehyde and a basic condensation catalyst, adding benzene to the reaction mixture, azeotropically distilling from the reaction mixture said ether, said benzene and water formed during the reaction, and heating the resulting substantially anhydrous polymer to depolymerization temperature in the presence of phosphorous pentoxide and thereby obtaining a monomeric lower alkyl α-cyanoacrylate.

14. The method which comprises heating to a temperature of about 50 to 90° C. a solution of a lower alkyl cyanoacetate, p-formaldehyde and a basic condensation catalyst in a non-aqueous organic solvent capable of forming an azeotrope with water formed during the reaction distilling below the depolymerization temperature of polymeric α-cyanoacrylate formed by the reaction, azeotropically distilling the resulting azeotrope from the reaction mixture and thereby obtaining a substantially anhydrous polymeric lower alkyl α-cyanoacrylate, and heating said polymeric lower alkyl α-cyanoacrylate to depolymerization temperature in the presence of phosphorous pentoxide and thereby obtaining a monomeric lower alkyl α-cyanoacrylate.

No references cited.